(12) United States Patent
Blaker et al.

(10) Patent No.: US 8,805,310 B2
(45) Date of Patent: Aug. 12, 2014

(54) SYSTEM AND METHOD FOR SEARCHING STORED AUDIO DATA BASED ON A SEARCH PATTERN

(75) Inventors: David A. Blaker, Holland, MI (US); Thomas R. Olson, Holland, MI (US); Brian L. Douthitt, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1734 days.

(21) Appl. No.: 10/585,502

(22) PCT Filed: Jan. 7, 2005

(86) PCT No.: PCT/US2005/000545
§ 371 (c)(1),
(2), (4) Date: Jun. 4, 2009

(87) PCT Pub. No.: WO2005/069302
PCT Pub. Date: Jul. 28, 2005

(65) Prior Publication Data
US 2010/0017210 A1    Jan. 21, 2010

Related U.S. Application Data

(60) Provisional application No. 60/534,620, filed on Jan. 7, 2004.

(51) Int. Cl.
*H04B 1/18* (2006.01)
*H04B 1/38* (2006.01)
*H04M 1/00* (2006.01)

(52) U.S. Cl.
USPC ............... 455/150.1; 455/152.1; 455/185.1; 455/563; 455/569.2

(58) Field of Classification Search
USPC .......... 455/3.01–3.02, 3.04–3.06, 563, 569.2, 455/152.1, 184.1–186.1, 344–345, 150.1
See application file for complete search history.

(56) References Cited

U.S. PATENT DOCUMENTS

| 4,682,370 | A | * | 7/1987 | Matthews | 455/166.2 |
| 5,355,527 | A | * | 10/1994 | Owaki | 455/186.2 |
| 5,410,361 | A | * | 4/1995 | Lee | 725/56 |
| 5,732,338 | A | * | 3/1998 | Schwob | 455/158.5 |
| 6,021,320 | A | * | 2/2000 | Bickford et al. | 455/186.1 |
| 6,038,434 | A | * | 3/2000 | Miyake | 455/186.1 |
| 6,829,475 | B1 | * | 12/2004 | Lee et al. | 455/419 |
| 6,961,549 | B2 | * | 11/2005 | Mori | 455/179.1 |
| 7,171,174 | B2 | * | 1/2007 | Ellis et al. | 455/132 |

(Continued)

FOREIGN PATENT DOCUMENTS

| EP | 0 312 778 A1 | 4/1989 |
| JP | 2002 157865 A | 5/2002 |

OTHER PUBLICATIONS

PCT International Search Report based on International Application No. PCT/US2005/000545, date of mailing of the International Search Report May 11, 2005 (3 pgs.).

*Primary Examiner* — Simon Nguyen
(74) *Attorney, Agent, or Firm* — Foley & Lardner LLP (57) ABSTRACT

A system for searching stored audio data is described. The system includes a memory configured to store audio data received from a radio receiver and a processing circuit. The processing circuit is configured to receive a search pattern, search the stored audio data for the search pattern, and provide audio data based on the search.

20 Claims, 5 Drawing Sheets

(56) References Cited

U.S. PATENT DOCUMENTS

| | | | |
|---|---|---|---|
| 7,209,410 B2* | 4/2007 | Yamanushi et al. | 369/2 |
| 7,227,071 B2* | 6/2007 | Tagawa et al. | 84/601 |
| 7,454,401 B2* | 11/2008 | Yamamoto et al. | 1/1 |
| 7,536,175 B2* | 5/2009 | Lee et al. | 455/412.1 |
| 7,555,259 B2* | 6/2009 | Kawamata et al. | 455/3.02 |
| 2002/0082841 A1* | 6/2002 | Wallers | 704/275 |
| 2003/0210350 A1* | 11/2003 | Kamiya | 348/563 |
| 2004/0176906 A1* | 9/2004 | Matsubara et al. | 701/200 |
| 2005/0043067 A1* | 2/2005 | Odell et al. | 455/569.2 |
| 2009/0023406 A1* | 1/2009 | Ellis et al. | 455/140 |

* cited by examiner

SYSTEM AND METHOD FOR SEARCHING STORED AUDIO DATA BASED ON A SEARCH PATTERN

The present application is a National Phase of International Patent Application No. PCT/US2005/00545, filed Jan. 7, 2005, which claims the benefit of U.S. Application No. 60/534,620, filed Jan. 7, 2004, both of which are incorporated herein by reference in their entireties.

BACKGROUND OF THE DISCLOSURE

The present innovation relates generally to the field of audio entertainment systems for a vehicle. More specifically, the present innovation relates to a system and method for searching stored audio data based on a search pattern to retrieve audio data.

Vehicle radios are utilized as a source for news, entertainment, weather, and other audio data while a person is driving in a vehicle. The person can tune the vehicle radio to a desired radio band to listen for the type of content they desire. However, users are restricted to listening to the audio data that is currently being broadcast and cannot chose the content of the radio transmissions.

Users can chose customized audio data using an audio storage medium such as a compact disc or a cassette tape. However, these mediums are not continuously updated and cannot be used as a source for recent weather or news. Additionally, the content of these sources is fixed and generally cannot be updated to provide variety.

Existing systems can be used to record audio data for later retrieval while driving. An example can include recording audio data to a cassette tape and playing the cassette tape while driving. Another example can include a memory associated with the radio configured to store audio data received at the radio. However, the recorded audio data will record everything and will not allow the user to specifically select desired audio data.

What is needed is a system and method for searching audio data received over a broadcast channel and stored in memory based on a search pattern to retrieve desired audio data. What is further needed is such a system or method further configured to search for either preset search patterns or custom search patterns. The teachings herein below extend to those embodiments which fall within the scope of the appended claims, regardless of whether they accomplish one or more of the above mentioned needs.

SUMMARY

One exemplary embodiment relates to a system for searching stored audio data. The system includes a memory configured to store audio data received from a radio receiver and a processing circuit. The processing circuit is configured to receive a search pattern, search the stored audio data for the search pattern, and provide audio data based on the search.

Another exemplary embodiment relates to a method of searching stored audio data. The method includes receiving a search pattern, searching stored audio data received over a radio to locate audio data correlating with the search pattern, and providing audio data from the stored audio data based on the search.

Yet another exemplary embodiment relates to a radio for a vehicle including a system for storing and searching audio data received over the radio. The radio includes at least one radio receiver configured to receive audio data being broadcast over a wireless network, a memory configured to store the received audio data, and a processing circuit configured to receive a search pattern, search the stored audio data for the search pattern, and provide audio data based on the search.

DETAILED DESCRIPTION OF THE EXEMPLARY EMBODIMENTS

Figure 1:
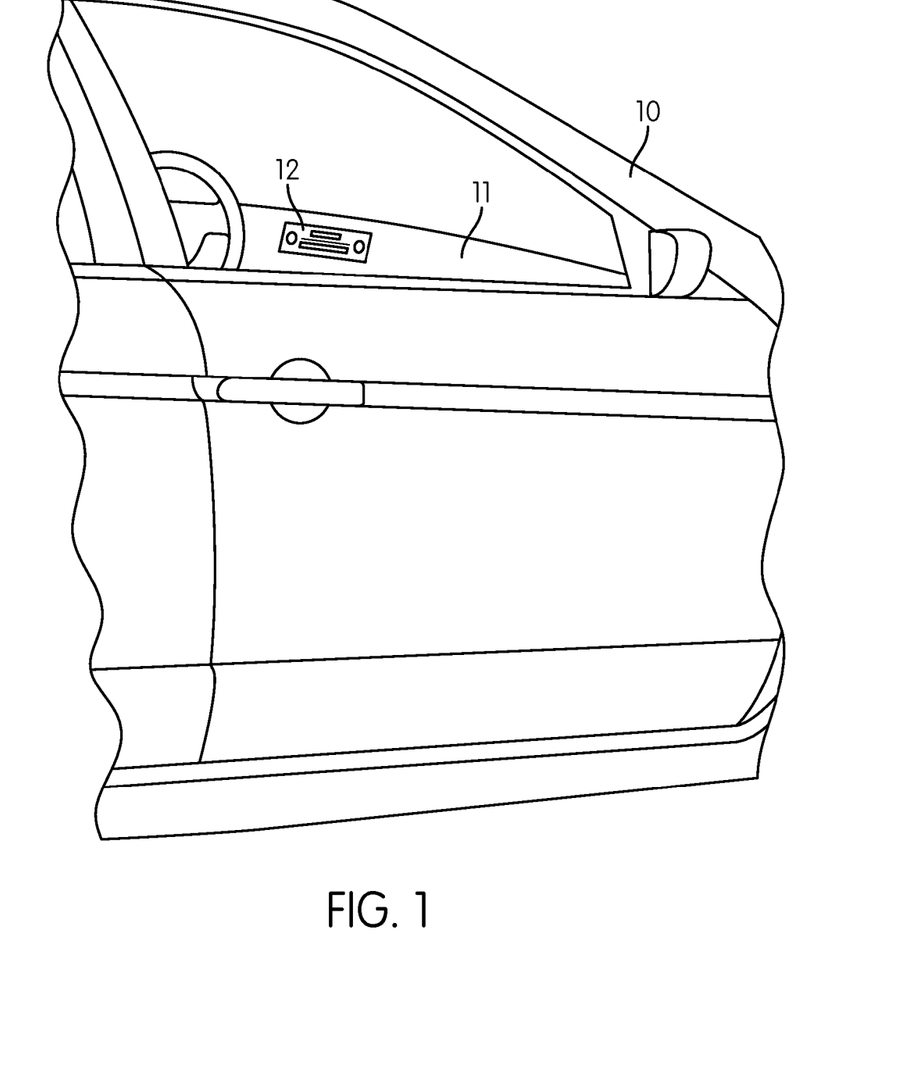
FIG. 1 is a schematic diagram of a vehicle including a system for searching stored audio data to find audio data correlating to a search pattern, according to an exemplary embodiment.

Referring first to FIG. 1, a vehicle 10, which may be an automobile, truck, sport utility vehicle (SUV), mini-van, or other vehicle, includes an audio recorder 12. Audio recorder 12, the exemplary embodiments of which will be described hereinbelow, is illustrated mounted to an instrument panel 11 of vehicle 10 preferably in a center console of instrument panel 11. Alternatively, audio recorder 12 can be coupled to other areas of instrument panel 11, or to other vehicle interior elements, such as, an overhead console, an overhead liner, a side wall of the vehicle, or other location in the front or rear of the vehicle.

Figure 2:
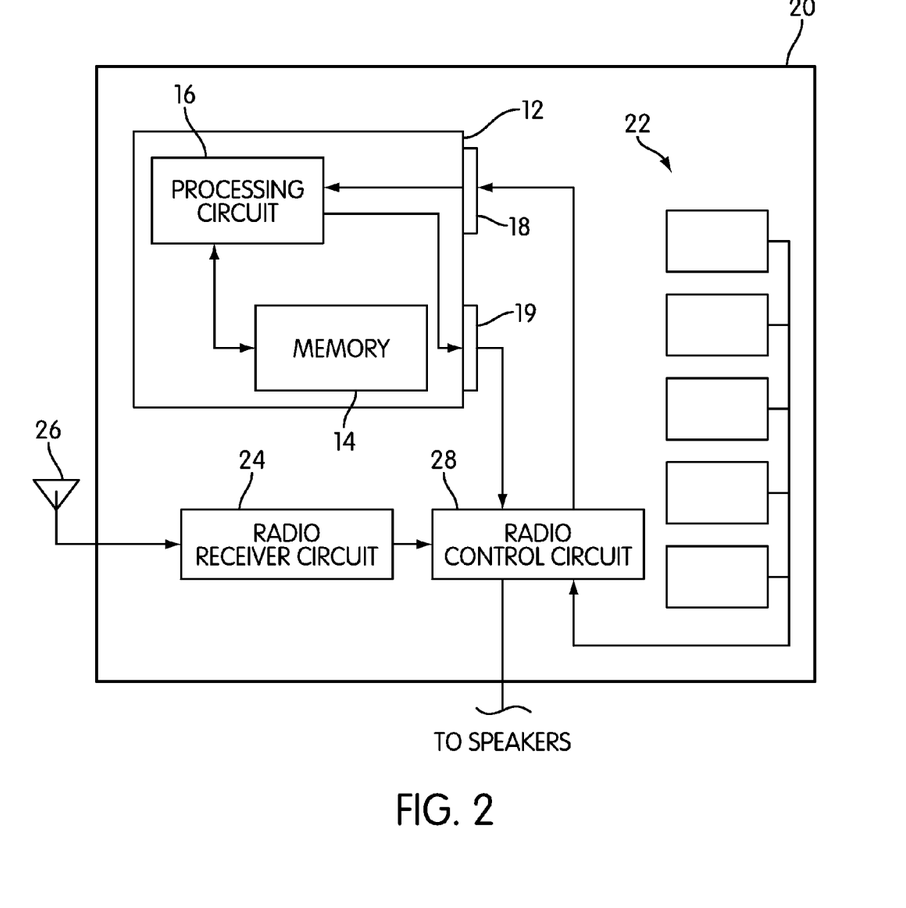
FIG. 2 is a block diagram of the system for searching stored audio data of FIG. 1, according to an exemplary embodiment.

Referring now to FIG. 2, audio recorder 12 is illustrated as a component of a vehicle radio 20. Vehicle radio 20 may be any type of receiver configured to receive a broadcast signal containing audio data and to play the audio data through speakers in the vehicle. Vehicle 20 includes input devices 22, a radio receiver circuit 24, an antenna 26, and a radio control circuit 28. Input devices 22 can be any type of device or devices for providing input data to vehicle radio 20, such as switches, buttons, a touch screen display, or other input devices, such as a speech recognition module. Radio receiver circuit 24 is any type of circuit configured to receive audio data from antenna 26 for communication to radio control circuit 28. Antenna 26 may any type of antenna configured to facilitate reception of signals from an audio source such as an AM radio station, an FM radio station, an XM satellite based radio station, etc. Radio control circuit 28 is any type of circuit configured to manage data flow and control components of vehicle radio 20.

According to an exemplary embodiment, audio recorder 12 is integrated into vehicle radio 20 such that audio recorder 12 is an integral component of vehicle radio 20. Audio recorder 12 is controlled by an operator through input devices 22 of vehicle radio 20. For example, input devices 22 of vehicle radio 20 can be utilized to select a search pattern and then to initiate a search of stored audio data, as will be further described below with reference to FIG. 3. Additionally, output data from audio recorder 12 is played through vehicle radio 20.

According to an alternative embodiment, audio recorder 12 may be a separate device that is not integrated with vehicle radio 20. Audio recorder 12 may be installed in vehicle 12 during manufacturing or as an after market accessory. Audio recorder 12 may further include additional circuitry or components to perform the functions described herein as being performed by vehicle radio 20.

Where audio recorder 12 is a separate device, audio recorder 12 may be coupled to vehicle radio 20 through a wired or wireless connection. For example, vehicle radio 20 may be coupled to audio recorder 12 through a communication bus or through a radio frequency (RF) network using the Bluetooth communication standard. According to another example, audio recorder 12 can be attached between vehicle radio 20 and vehicle speakers (not shown).

Audio recorder 12 includes a memory 14, a processing circuit 16, an input circuit 18, and an output circuit 19. One or more of the above listed components may be shared components with vehicle radio 20. Memory 14 and circuits 16, 18, 19, 24 and 28 are illustrated in block form to indicate that these elements are functional units which may be embodied in hardware circuitry, software, or other processing elements. For example, processing circuit 16 may be disposed on one or more integrated circuits, and may be part of a system-on-chip (SOC), and/or may include programmable logic, one or more microprocessors, microcontrollers, or other control circuitry.

Memory 14 is a low cost dynamic random access memory (DRAM). According to an alternative embodiment, memory 14 may be long term storage memory such as a flash card or a hard drive. Memory 12 may include volatile memory portions and non-volatile memory portions, and may include RAM, read-only memory, and/or other memory types.

Input circuit 18 may be a single or multiple input circuits configured to receive input data at audio recorder 12 through vehicle radio 20. For example, input circuit 18 may include a communication bus between audio recorder 12 and vehicle radio 20. Using the communication bus, data can be transmitted from vehicle radio 20 to audio recorder 12. Exemplary data can include audio data for storage in memory 14, control signals for processing by processing circuit 16, etc.

Alternatively, input circuit 18 may be configured to receive input data directly from an external source instead of through vehicle radio 20. One example can include where audio recorder 12 is an external device that is directly controlled by a user and input circuit 18 receives input data from the user. According to another alternative embodiment, input circuit 18 can be coupled to a microphone to receive a custom search pattern to search stored audio data, as will be further described below with reference to FIG. 3.

Output circuit 19 is configured to provide audio data or other data from audio recorder 12 to vehicle radio 20 or any other device. For example, output circuit 19 provides audio data to vehicle radio 20 for playing through vehicle radio 20.

Figure 3:
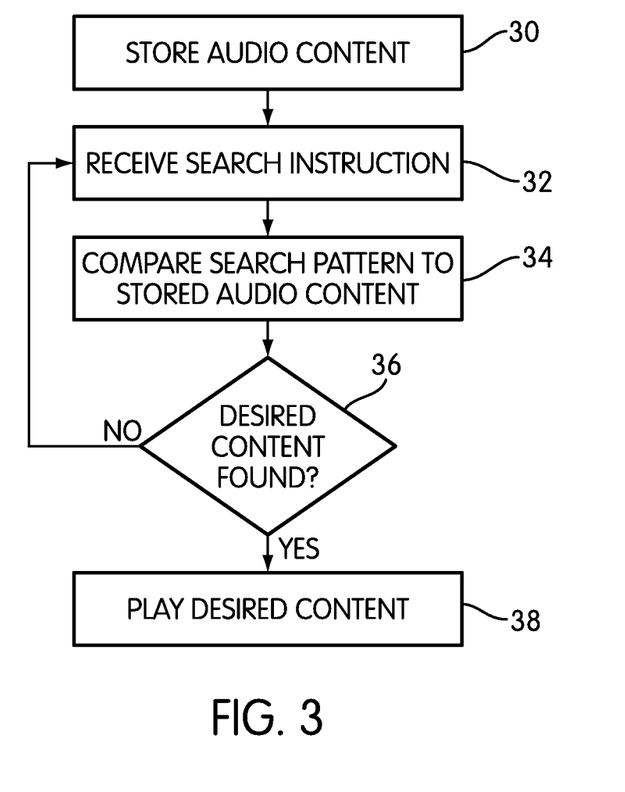
FIG. 3 is a flowchart of a method for searching stored audio data to find audio data correlating to a search pattern, according to an exemplary embodiment.

Referring now to FIG. 3, an exemplary method for searching audio data based on a received search pattern will now be described. It is understood that one or more of the steps in this exemplary method may be eliminated, additional steps may be added, or the steps may be rearranged in various embodiments.

In a step 30, audio recorder 12 is configured to receive audio data through input circuit 18 from vehicle radio 20. Input circuit 18 can be configured to provide a wired or wireless connection to vehicle radio 20, antenna 26, radio receiver circuit 24, or any other source of audio data. Alternatively, audio data can be received from a removable memory device having radio data stored therein. The source of audio data can be integrated within audio recorder 12 such that the audio data is received directly from an audio data source. An example includes where audio recorder 12 includes an antenna and a radio receiver configured to receive audio data for broadcast channels.

Memory 14 is configured to store the received audio data. Processing circuit 16 may be configured to perform one or more operations on the received audio data such as compression, filtering, data searching, etc. For example, processing circuit 16 may search received audio data for preset search patterns as it is being stored, as will be further described below with reference to step 36.

Audio recorder 12 may be configured to record received audio data continuously as audio data is received, during preset times as selected by a user, whenever a specific search pattern is recognized in audio data received by audio recorder 12, or according to any other triggering event or period of time. A user of audio recorder 12 may program processing circuit 12 to record according to one or more periods or patterns. Further, a user may select the audio data to be received at audio recorder 12 by changing a band on vehicle radio 20. Audio recorder 12 may be configured to record audio data even while a vehicle is not occupied or running.

For example, audio recorder 12 may be configured to record continuously. Continuous recording may be desirable where a user wants to store everything that is received in order to have the largest amount of data to search through. However, where everything is recorded, memory 14 may become full. Accordingly, audio recorder 12 may include an option for the user to select either to overwrite old stored audio data or to stop recording when memory 14 becomes full.

Alternatively, a user may wish to configure audio recorder 12 to only record during specific periods. For example, the user may wish to configure audio recorder 12 to record during a "News Hour" on a specific radio station to record only news data.

According to an exemplary embodiment, audio recorder 12 may be configured such that audio data can continue to be stored while retrieved data is being broadcast through vehicle radio 12. For example, a user may wish to listen to stored audio data but still record audio data that is currently being broadcast over a radio channel. Further, upon entering vehicle 10, a user may wish to listen to the beginning of a program that began while they were away from their vehicle and record the remainder of the program that is currently being broadcast. This allows the user to "time shift" the program. Yet further, a user may wish to "rewind" audio content that is being broadcast to listen to just completed audio data again while still recording what is currently being broadcast. Accordingly, processing circuit 16 is configured to continue to record new data while providing stored data to the user via vehicle radio 20.

According to yet another exemplary embodiment, audio recorder 12 may include or be coupled to multiple radio receivers or a receiver capable of receiving multiple broadcast channels such that audio data can be received and/or stored from multiple broadcast channels simultaneously. In one embodiment, audio recorder 12 can record audio data from one receiver (e.g., from a frequency modulation (FM) band) while vehicle radio 20 plays audio data via speakers from another receiver (e.g., from the amplitude modulation (AM) band). Audio recorder 12 or vehicle radio 20 may include controls for selecting from multiple stored audio data segments correlating with different recording periods.

In a step 32, audio recorder 12 receives a search instruction from a user via input devices 22 or from another source. The search instruction includes a search pattern. A search pattern can be specific audio data (e.g. a recorded, spoken word), specific content of audio data (e.g. a pre-stored term, such as "News" or "Weather"), or one or more characteristics of the audio data (e.g. intermittent breaks or silences in the audio data indicative of spoken words as opposed to music). The search instruction may also include additional data such as the number of instances of the search pattern to be found, the place to begin searching, the broadcast channel to be searched, etc. According to an exemplary embodiment, a search pattern can be a frequency distribution or series of frequency distributions representing a word or phrase, further described below with reference to FIGS. 4A and 4B. For example, the search pattern may be a series of frequency distribution representing the word "News."

Figure 4A:
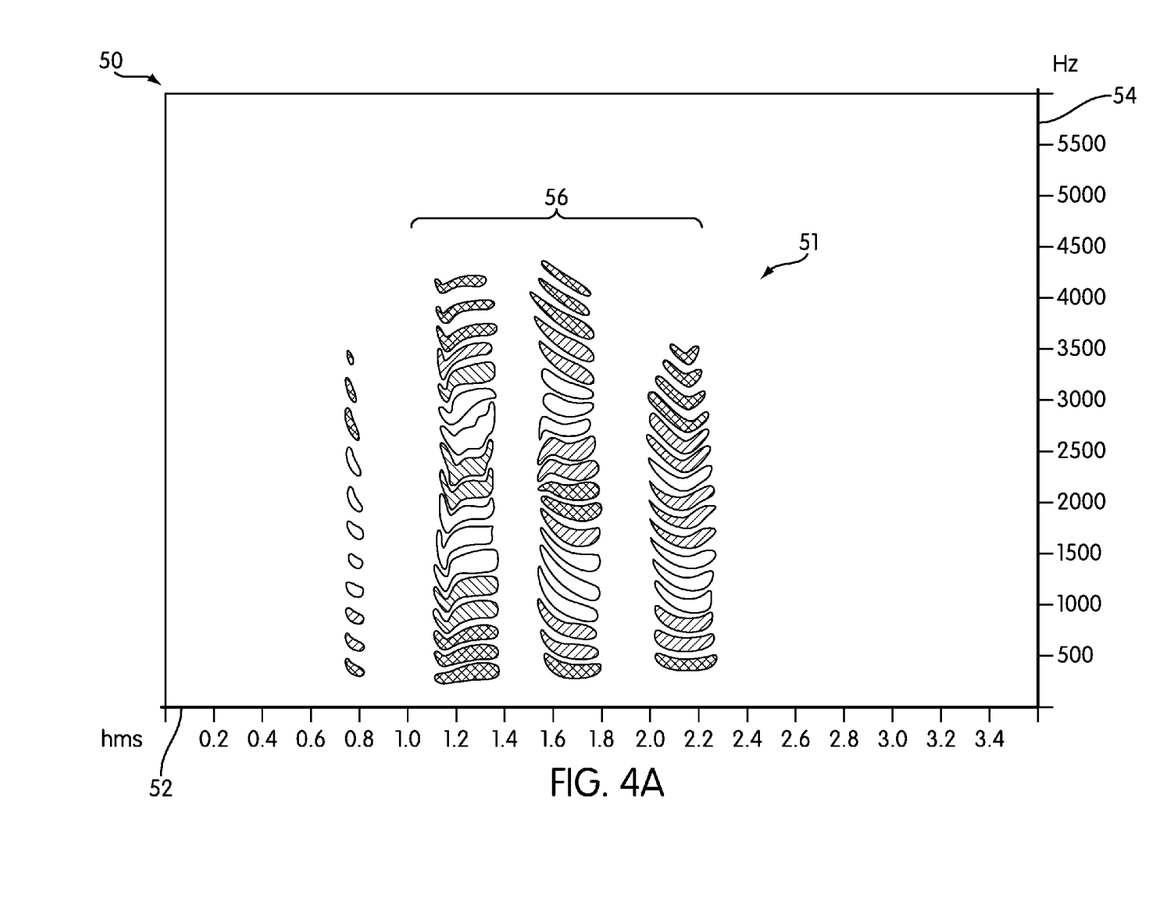
FIGS. 4A and 4B are graphs illustrating frequency distributions for audio data, according to an exemplary embodiment.

Referring now to FIG. 4A, a spectrogram 50 illustrating frequency and amplitude over time for stored audio data is shown according to an exemplary embodiment. A first axis 52 represents time and a second axis 54 represents the frequency of the stored audio data at a particular time. According to an exemplary embodiment, for each frequency at a particular time, a level of grey scale is shown representing amplitude of the frequency component in the stored audio data at that particular time. The brightness of the level of grey scale represents the amplitude, where a brighter grey scale represents a larger amplitude and a darker gray scale represents a lower amplitude. As shown in graph 50, at each instant in time, the level of gray scale associated with different frequencies for the stored audio data creates a pattern of highs and lows. The high and lows of the frequency pattern correspond to changes in frequency that occur in spoken words and music. For example, a defined subsection 56 of frequency distribution 51 may correspond to the spoken word "news" according to an exemplary embodiment.

According to an exemplary embodiment, a frequency distribution is a graph of the amplitude at given frequencies at any particular time. Although the frequency distribution, as shown in FIG. 4A, is composed of a grey scale value representing amplitude for each frequency, the amplitude may also be represented as a value on a third axis, for example extending along a z-axis, as a color scale value, or using any other method for representing an amplitude for a given frequency at a given time.

Figure 4B:
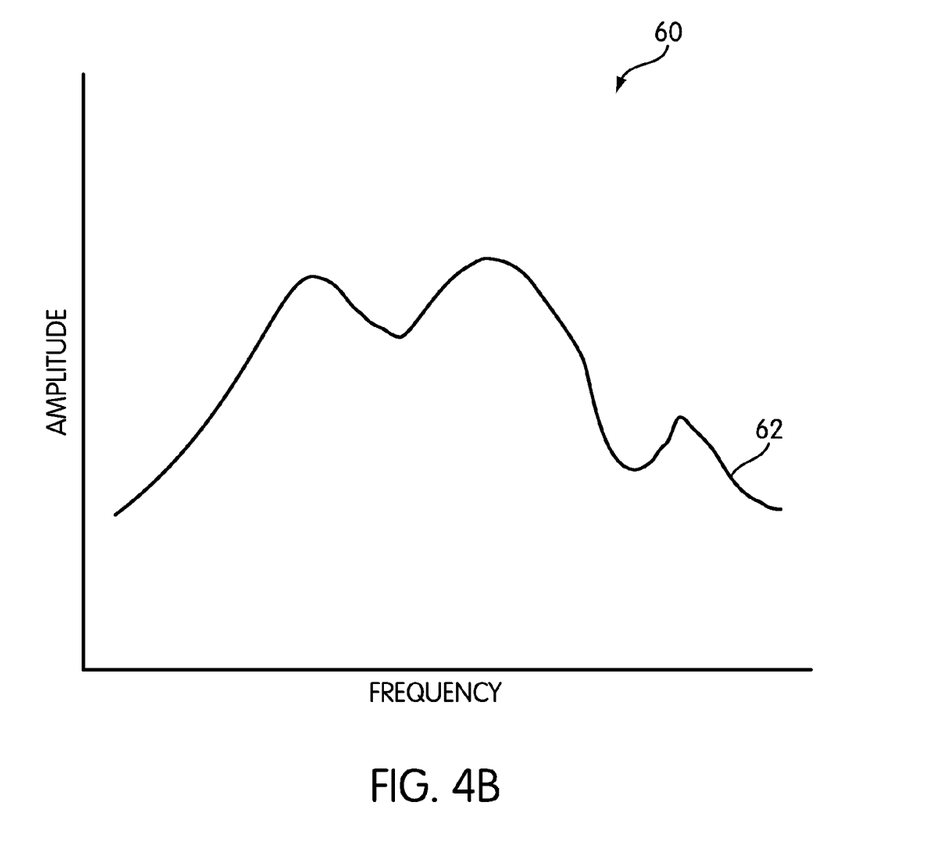

Referring now to FIG. 4B, a graph 60 of a frequency distribution 62 for a search pattern at a particular instant in time is shown according to an exemplary embodiment. Frequency distribution 62 correlates to a "slice" of a specific word, phrase, or other audio data at a particular instant in time. According to an exemplary embodiment, frequency distribution 62 corresponds to a section of the word "news" as described above with reference to step 32 in FIG. 3.

Referring again to step 32 in FIG. 3, processing circuit 16 is configured to receive the search instruction based on selection by the user of a preset search pattern. For example, audio recorder 12 may be configured to include a variety of preset search patterns corresponding to frequently used search terms. Examples can include search patterns for the words "news", "weather", "traffic", etc. Further, each search pattern may also include a listing of related words that are also searched whenever a preset search pattern is selected. For example, whenever the "weather" is selected; the search pattern can include the word "weather" and alternatively include the words "degree", "temperature", "forecast", etc.

According to an alternative embodiment, audio recorder 12 may also be configured to receive custom search patterns. A custom search pattern may be a search pattern for a word that is spoken by a user and recorded through input circuit 18 using a microphone coupled to audio recorder 12. Advantageously, custom search patterns allow a user to have greater versatility in searching stored audio data. For example, a user that wishes to search stored audio data for a song by a favorite artist can simply state the artist's name into the microphone. The audio data received through the microphone can be processed to determine a frequency distribution for the artist's name. Processing circuit 16 can utilize the frequency distributions for the artist's name and search the stored audio data to locate that artists name, presumably at the beginning or ending of the song. Alternatively, a user can sing a phrase from the song to search for the song.

Custom search patterns are also advantageous because the patterns allow a user to search stored audio data in a variety of languages. The user can state a foreign word or phrase into the microphone and the stored audio data will be searched for that word or phrase in the foreign language. Accordingly, audio recorder 12 can be used to search audio data received over a foreign language channel.

Following receipt of a search instruction in step 32, processing circuit 16 compares a series of frequency distributions for the search pattern in the received search instruction to the frequency distribution for the stored audio data in a step 34. According to an exemplary embodiment, frequency distribution 51 is scanned to locate a subsection of the frequency distribution that contains a subsection correlating with a frequency distribution of the search pattern. For example, referring again to FIGS. 4A and 4B, in comparing graph 60 to graph 50, frequency distribution 62 in FIG. 4B roughly correlates to a slice within subsection 56 of frequency distribution 51 in FIG. 4A. In other words, that instant in time of subsection 56 of frequency distribution 51 and frequency distribution 62 both correlate to the word "News." Comparison of a series of frequency distributions may be utilized to determine correlation. The number of frequency distributions compared may be increased or decreased as needed to balance processing speed and accuracy.

Other comparisons and other methods to recognize search patterns within the stored audio content may alternatively be used. According to an exemplary embodiment, recognition of spoken words may be performed using baseforms. Each word in a vocabulary may be represented as a sequence of phonemes which are combined to form the pronunciation of the word. This sequence of phonemes is generally referred to as the baseform of a word. Baseforms may be created based on received audio input from a user including the word or words to be converted. The baseforms may then be matched to correlating data in received or stored audio data. Accordingly, recognizing search patterns within audio content may include matching baseforms with the data in the audio content. Any type of voice recognition software may also be used to accomplish the comparison of the speech pattern to the stored audio data, such as ViaVoice® software from International Business Machines, Inc. of Armonk, N.Y.

According to another exemplary embodiment, search pattern recognition may be performed using text to grammar conversions. A grammar is an object which indicates what words a user is expected to say and in what patterns those words may occur. Grammars are important to speech recognizers because they constrain the recognition process. These constraints makes recognition faster and more accurate because the recognizer does not have to check for words or phrases that are not of interest.

However, differences in speech patterns, inflections, accents, etc. can affect a frequency distribution for a spoken word. Accordingly, the frequency distribution for a search pattern may not exactly correlate to any particular subsection in the frequency distribution for the stored audio data. Accordingly, audio recorder 12 is configured to compare multiple characteristics of the frequency distribution of the search pattern to the frequency distribution of the stored audio data, and select a subset of the frequency distribution for the stored audio data with the highest correlation. The characteristics to be compared may include: a mean, a variance, position of mode or highest peak, position of mode relative to minimum, maximum, or mean, squared difference of each frequency distribution between the search pattern and the stored audio data to find the best correlation, etc. Other characteristics or calculations may also or alternatively be used to determine the best correlation between the search pattern and the stored audio data.

According to an alternative embodiment, step 34 can be performed continuously whenever audio data is being stored to pre-search the stored audio data. Processor 16 can be configured to search audio data for frequency distributions correlating to the frequency distributions of one or more search patterns while the audio data is being stored. Whenever a frequency distribution is found that correlates to a frequency distribution for a search pattern, the location in memory 14 of that stored audio data can be stored in memory for later retrieval.

Advantageously, pre-searching the stored audio data can greatly reduce the response time of audio recorder 12. Additionally, a less powerful processing circuit 16 can be utilized because less processing occurs when audio data correlating to a pre searched search pattern is requested. Less processing is required because the stored audio data is searched over time as it is recorded instead of instantaneously when a search is requested.

Further, processing circuit 16 may be configured to begin storing audio content based on the occurrence of a frequency distribution correlating to the frequency distribution of one or more search patterns for some duration. Advantageously, recording based on the occurrence of a search pattern conserves memory 14 by only recording content prefixed or immediately adjacent to by a search pattern. Additionally, where audio recorder 12 is configured to buffer received audio content, the audio content preceding the search pattern may also be stored.

Following the comparison in step 34, a determination is made in a step 36 whether the desired content was found. If not, the processing circuit returns to step 32 to receive a new search pattern. In some instances, it may be that a match between a search pattern and data in the stored audio data fails because of a factor affecting the frequency distribution for either the search pattern or the stored audio data. Examples may include an announcer on a radio station with a pronounced accent or a custom search pattern received from a person with an inflection. In this instance processing circuit 16 may be configured to assign the search pattern or stored audio data to a frequency distribution that will produce a match.

If a match is found, audio recorder 12 can play the stored audio data through vehicle radio 20 from the point where the frequency distribution of the stored audio data correlated with the frequency distribution of the search pattern in a step 38. The audio data that is played through vehicle radio 20 may or may not reflect the audio data that is sought by the user of audio recorder 12. If the content is not what is sought, the user can provide an input to repeat step 34 to search for the next instance of the search pattern in the stored audio data, may refine the search pattern, access stored audio data from a different period or broadcast channel, etc.

Advantageously, an audio recorder 12 can be implemented for a relatively low cost. Memory 14 may be a relatively inexpensive 128 MB dynamic random access memory (DRAM) memory unit that can record 17 minutes of uncompressed audio data. Even more data can be recorded to memory 14 if the data is audio data from an AM radio station including traffic and weather reports. Audio compression may be added to further increase the storage time. Further, audio compression may increase the accuracy and speed of computations or decrease the number of computations required for search pattern recognition.

According to an exemplary embodiment, the received audio data may include both aural and non-aural content. For example, the received audio data may include non-aural Radio Data System (RDS) data. RDS is a standard for sending small amounts of digital information using conventional radio broadcasts. RDS audio data may include, but is not limited to, alternate frequencies allowing a receiver to re-tune to a different frequency providing the same station when the first signal becomes too weak, clock time, station identification, program type, song titles, artist names, travel announcements, etc. Advantageously, the above described system may be configured for searching the audio data including both the aural and the non-aural content. For example, a user may provide input to search all stored audio content data for a particular artist name. Although RDS data is described, non-aural content may include any type of data providing information related to the aural content. The system may be configured to either search the aural audio content to find the artist's name, to search the non-aural audio content for the artist's name, or both.

While the exemplary embodiments illustrated in the FIGS. and described above are presently preferred, it should be understood that these embodiments are offered by way of example only. Accordingly, the present invention is not limited to a particular embodiment, but extends to various modifications that nevertheless fall within the scope of the appended claims.

What is claimed is:

1. A system for searching stored audio data, the system comprising:
 a memory configured to store audio data comprising a plurality of audio frequency distributions received over a plurality of broadcast channels from a radio receiver;
 an input device configured to receive a search pattern comprising at least one frequency distribution in aural content from a vehicle occupant; and
 a processing circuit in communication with the memory and the input device, the processing circuit configured to receive the search pattern, to search the stored audio data for the search pattern by comparing the at least one frequency distribution in the aural content from the vehicle occupant with multiple characteristics of the stored audio data comprising the audio frequency distributions, wherein the processing circuit is further configured to provide, to an output circuit, audio data from the stored audio data that correlates to the search pattern, and wherein the comparison comprises:
 a first correlation test in which a first function of the search pattern is compared to a first function of the stored audio data, and
 a second correlation test in which a second function of the search pattern is compared to a second function of the stored audio data,
 wherein the first function and the second function are different functions.

2. The system of claim 1, further including a radio receiver configured to receive audio data over an antenna.

3. The system of claim 2, wherein the received audio data includes both aural and non-aural content.

4. The system of claim 3, wherein the non-aural content includes RDS data.

5. The system of claim 2, wherein the radio receiver include multiple antennae such that audio data is received from multiple sources simultaneously.

6. The system of claim 1, wherein the processing circuit is further configured to search the stored audio data as the stored audio data is being received by the processing circuit and stored in the memory.

7. The system of claim 1, wherein the search pattern is a spoken word.

8. The system of claim 7, wherein the search pattern further includes additional terms related to the spoken word.

9. The system of claim 1, wherein searching the stored audio data includes matching one or more baseforms to the content of the stored audio data.

10. The system of claim 1, further including a microphone configured to receive a search pattern from a user.

11. The system of claim 1, wherein the output circuit is provided the stored audio data from the location in the stored audio data where the correlation occurs.

12. The system of claim 11, wherein after the output circuit is provided the stored audio data, a second search of the stored audio data for the next instance of the search pattern is performed in response to input received at the input device.

13. The system of claim 1, wherein the first function is at least one of a mean of a frequency distribution, a variance of a frequency distribution, a position of the highest amplitude peak of a frequency distribution, a position of a mode amplitude of a frequency distribution, a squared difference of a first frequency distribution and a second frequency distribution, and a position of a mode amplitude of a frequency distribution relative to at least one of a minimum amplitude, maximum amplitude, and mean amplitude, and wherein the second function is at least one of a mean of a frequency distribution, a variance of a frequency distribution, a position of the highest amplitude peak of a frequency distribution, a position of a mode amplitude of a frequency distribution, a squared difference of a first frequency distribution and a second frequency distribution, and a position of a mode amplitude of a frequency distribution relative to at least one of a minimum amplitude, maximum amplitude, and mean amplitude.

14. A method of searching stored audio data received over a plurality of broadcast channels at a radio receiver of a vehicle radio, the method comprising:
receiving a search pattern comprising at least one frequency distribution in aural content from a vehicle occupant;
searching stored audio data comprising audio frequency distributions, received over the plurality of broadcast channels from the radio receiver, for the search pattern;
comparing multiple characteristics of the at least one frequency distribution of the search pattern with the frequency distributions of the stored audio data using a processor; and
providing, to an output circuit, audio data from the stored audio data that correlates to the search pattern,
wherein comparing comprises:
a first correlation test in which a first function of the search pattern is compared to a first function of the stored audio data, and
a second correlation test in which a second function of the search pattern is compared to a second function of the stored audio data,
wherein the first function and the second function are different functions.

15. The method of claim 14, wherein the search pattern is a spoken word and the frequency distribution for the search pattern is the frequency distribution that is produced when the spoken word is spoken.

16. The method of claim 15, wherein searching stored audio data received over a radio to find audio data correlating with the search pattern includes searching for frequency distributions for terms related to the spoken word in addition to searching for the frequency distribution for the spoken word.

17. The method of claim 14, wherein searching stored audio data received over a radio to find audio data correlating with the search pattern further includes searching the stored audio data while it is being stored.

18. The method of claim 14, wherein searching stored audio data received over a radio to find audio data correlating with the search pattern further includes matching one or more baseforms to the content of the stored audio data.

19. The method of claim 14, wherein receiving a search pattern includes receiving audio data from a microphone.

20. The method of claim 14, wherein the first function is at least one of a mean of a frequency distribution, a variance of a frequency distribution, a position of the highest amplitude peak of a frequency distribution, a position of a mode amplitude of a frequency distribution, a squared difference of a first frequency distribution and a second frequency distribution, and a position of a mode amplitude of a frequency distribution relative to at least one of a minimum amplitude, maximum amplitude, and mean amplitude, and wherein the second function is at least one of a mean of a frequency distribution, a variance of a frequency distribution, a position of the highest amplitude peak of a frequency distribution, a position of a mode amplitude of a frequency distribution, a squared difference of a first frequency distribution and a second frequency distribution, and a position of a mode amplitude of a frequency distribution relative to at least one of a minimum amplitude, maximum amplitude, and mean amplitude.

* * * * *